US006988361B2

(12) United States Patent
van Nieuwstadt et al.

(10) Patent No.: US 6,988,361 B2
(45) Date of Patent: Jan. 24, 2006

(54) METHOD AND SYSTEM FOR CONTROLLING SIMULTANEOUS DIESEL PARTICULATE FILTER REGENERATION AND LEAN NOX TRAP DESULFATION

(75) Inventors: Michiel van Nieuwstadt, Ann Arbor, MI (US); John Cavataio, Dearborn, MI (US); Thomas A. Brewbaker, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 10/694,310

(22) Filed: Oct. 27, 2003

(65) Prior Publication Data

US 2005/0086933 A1 Apr. 28, 2005

(51) Int. Cl.
*F01N 3/00* (2006.01)

(52) U.S. Cl. ............................ 60/295; 60/274; 60/276; 60/285; 60/297

(58) Field of Classification Search .................. 60/274, 60/276, 285, 295, 297, 301
See application file for complete search history.

(56) References Cited

U.S. PATENT DOCUMENTS 5,746,989 A * 5/1998 Murachi et al. ......... 423/213.7
5,908,480 A 6/1999 Ban et al.
5,961,931 A 10/1999 Ban et al.
5,974,791 A * 11/1999 Hirota et al. ................. 60/276
6,322,605 B1 11/2001 He et al.
6,397,587 B1 6/2002 van Nieuwstadt et al.
6,568,173 B1 5/2003 Kolmanovsky et al.
6,594,990 B2 7/2003 Kuenstler et al.
6,718,757 B2 * 4/2004 Khair et al. .................. 60/286
6,745,560 B2 * 6/2004 Stroia et al. .................. 60/286
6,779,339 B1 * 8/2004 Laroo et al. .................. 60/297

* cited by examiner

*Primary Examiner*—Binh Q. Tran
(74) *Attorney, Agent, or Firm*—Julia Voutyras; Allan J. Lippa; Richard M. Sharkansky

(57) ABSTRACT

A method and system for simultaneously regenerating a particulate filter coupled to an internal combustion engine and for desulfating a lean NOx trap disposed downstream of the particulate filter. The method includes adjusting at least one engine operating parameter to maintain a desired air fuel ratio for gases exiting the particulate filter in accordance with a difference between a reference set point air fuel ratio level and the air fuel ratio of gases exiting the particulate filter and wherein the reference set point level is changed between a rich air fuel ratio and a lean air fuel ratio as a function of the air fuel ratio of the gases exiting the lean NOx trap.

20 Claims, 6 Drawing Sheets

METHOD AND SYSTEM FOR CONTROLLING SIMULTANEOUS DIESEL PARTICULATE FILTER REGENERATION AND LEAN NOX TRAP DESULFATION

INCORPORATION BY REFERENCE

This patent application incorporates herein by reference the entire subject mater of U.S. patent application Ser. No. 10/063454 filed Apr. 24, 2002 entitled "Control for Diesel Engine With Particulate Filter, inventors Michiel van Nieuwstadt and Tom Brewbaker, assigned to the same assignee as the present invention.

TECHNICAL FIELD

This invention relates generally to methods and systems diesel engines having a diesel particulate filter (DPF) and a lean NOx trap (LNT).

BACKGROUND

As is known in the art, future diesel powertrains will likely be equipped with diesel particulate filters (DPF) and lean NOx traps (LNT). The DPF traps soot in the exhaust and needs to be regenerated, i.e. the soot needs to be burned off, every 500 miles or so. This is achieved by elevating the temperature (to around 600 deg C.) and providing enough oxygen to combust the soot. LNTs are poisoned by sulfur in the fuel and oil, and need to be desulfated every 3000 miles or so. This is achieved by elevating the temperature (to around 700 degrees C.) and depleting the exhaust gas of oxygen, i.e. running rich. Heating the exhaust gas and depleting oxygen uses extra fuel, which reflects negatively on the fuel economy.

The inventors have recognized that it would be desirable to coordinate both processes efficiently and to use the synergies to the largest extent possible. This invention proposes such coordination between DPF regeneration and LNT desulfation (deSOx).

SUMMARY

In accordance with the present invention, a method and system are is provided for simultaneously regenerating a particulate filter coupled to an internal combustion engine and for desulfating a lean NOx trap disposed downstream of the particulate filter. The method includes producing regeneration in the particulate filter. The regeneration produces an exhaust gas exiting the particulate trap having an elevated temperature and reduced oxygen concentration relative to gases entering such particulate filter. The exiting gases produce desulfation in the lean NOx trap.

In one embodiment, the method includes adjusting at least one engine operating parameter to control both regeneration in the particulate filter and the desulfation of the lean NOx trap.

In accordance with another feature of the invention, a method is provided for simultaneously regenerating a particulate filter coupled to an internal combustion engine and for desulfating a lean NOx trap disposed downstream of the particulate filter. The method includes adjusting at least one engine operating parameter to maintain a desired air fuel ratio for gases exiting the particulate filter in accordance with a difference between a reference set point air fuel ratio level and the air fuel ratio of gases exiting the particulate filter. The reference set point level is changed between a rich air fuel ratio and a lean air fuel ratio as a function of the air fuel ratio of the gases exiting the lean NOx trap.

In one embodiment, the method includes changing the reference set point level as a function of oxygen consumption of oxygen across the particulate filter In one embodiment, the regeneration control comprises: commencing a self-sustaining filter regeneration; monitoring whether said regeneration causes temperature of said particulate filter to become greater than a predetermined value; and, in response to said monitoring, adjusting one or more operating parameters so as to limit exothermic reaction via control of an excess oxygen amount entering said filter and prevent temperature from rising to become greater than a pre-selected value.

In accordance with yet another feature of the invention, a method is provided for simultaneously regenerating a particulate filter coupled to an internal combustion engine and for desulfating a lean NOx trap disposed downstream of the particulate filter. The method includes controlling the oxygen concentration of the gas exiting the lean NOx trap by commanding an oxygen concentration setpoint for the gas entering the lean NOx trap, such commanded oxygen concentration being controlled by commanding an oxygen concentration setpoint for the gas entering the particulate filter.

In accordance with still another feature of the invention, a method is provided for simultaneously regenerating a particulate filter coupled to an internal combustion engine and for desulfating a lean NOx trap disposed downstream of the particulate filter. The method includes providing an oxygen sensor upstream of the particulate filter and using a signal produced by such sensor to control the particulate filter regeneration rate by metering the oxygen flow sensed by sensor and; providing an oxygen sensor downstream of the particulate filter and using a signal produced by such sensor to control the oxygen content of the gas entering the lean NOx trap.

In accordance with another feature of the invention, a method is provided for simultaneously regenerating a particulate filter coupled to an internal combustion engine and for desulfating a lean NOx trap disposed downstream of the particulate filter. The method includes adjusting the oxygen level into the particulate filter, comprising: reducing the oxygen content of the gas entering the particulate filter if the oxygen concentration measured by downstream oxygen sensor is greater than a predetermined level, such latter oxygen content being measured by the upstream oxygen sensor; increasing the oxygen content of the gas entering the particulate filter if the oxygen concentration measured by downstream oxygen sensor is less than the predetermined level, such latter oxygen content being measured by the upstream oxygen sensor.

In one embodiment the method includes monitoring the temperature of the gas exiting the particulate filter and reducing the oxygen concentration into the particulate filter if such measured temperature becomes greater than a predetermined level.

In one embodiment, the method includes monitoring the temperature of the gas exiting the lean NOx trap and increasing the oxygen concentration into the particulate filter if such measured temperature becomes greater than a predetermined level.

The inventors have observed that, in general, the oxygen content of the gas exiting the particulate filter will be lower than that entering the particulate filter, since soot combustion removes oxygen. By adjusting the oxygen level into the particulate filter there is a resulting increase the CO level out of the particulate filter. The CO acts as a reductant for desulfation. Lower oxygen concentration into the particulate filter results in a higher CO concentration out of the particulate filter and vice versa.

If the oxygen measured by oxygen sensor upstream of the lean NOx trap is too high, the oxygen content of the gas entering the particulate filter can be reduced (by the means set forth in the above-referenced patent application). This will increase the flow of reductant and decrease the oxygen flow into the lean NOx trap.

If the gas entering the lean NOx trap is too rich, sulfur is released preferentially as H2S, which is undesirable. If the oxygen sensor upstream of the lean NOx trap measures exhaust gas that is too rich, the oxygen concentration into the particulate filter can be increased. This may lead to excessive exotherms, since higher oxygen concentrations allow a higher soot bum rate. The control strategy herein described monitors the temperature of the gas exiting the particulate filter and reduces the particulate filter inlet oxygen concentration if this temperature becomes too high. The optimal oxygen flow into the particulate filter is therefore a trade-off between particulate filter temperature, soot burn rate, and $H_2S$ release by the lean NOx trap.

Thus, the invention utilizes the heat generated already for particulate filter regeneration and the removal of oxygen from the exhaust stream by soot combustion to create rich exhaust gas, and to achieve lean NOx trap desulfation. The lean NOx trap desulfation then only takes a minimal penalty on fuel economy above that for particulate filter regeneration.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
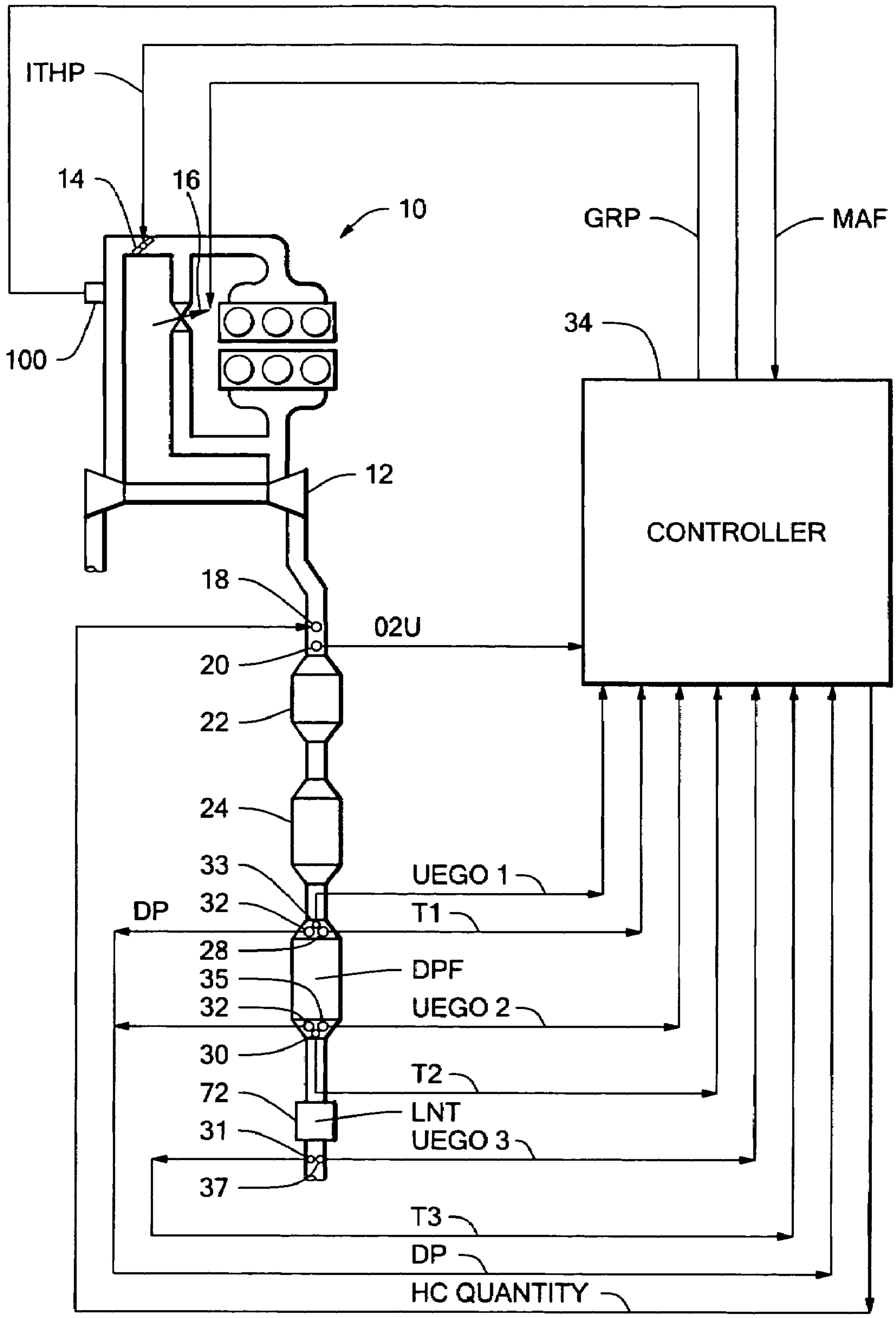
FIG. 1 is a diagram of an engine system according to the invention.

Referring now to FIG. 1, a schematic diagram of the engine system is shown. Engine 10 is shown coupled to a turbo charger 12. Turbo charger 12 can be any number of types, including a single stage turbo charge, a variable geometry turbo charger, a dual fixed geometry (one for each bank), or a dual variable geometry turbo charger (one for each bank).

Intake throttle 14 is shown for controlling manifold pressure and air flow entering the engine 10. In addition, EGR valve 16 is shown for controlling recirculated exhaust gas entering the intake manifold of engine 10. In the exhaust system, downstream of turbocharger 12, is HC injector 18.

Located downstream of injector 18 is an oxygen sensor 20, which provides signal O2U representative of the stoichiometry of the gases passing through it.

Downstream of oxygen sensor 20 is located a first oxidation catalyst 22. A second oxidation catalyst 24 may also be used but may also be eliminated. The oxidation catalyst can be of various types, such as, for example, an active lean NOx catalyst. Further downstream of catalyst 24 is located a diesel particulate filter (DPF) 26. Downstream of the DFP 26 is a lean NOx trap (LNT) 72.

Figure 3:
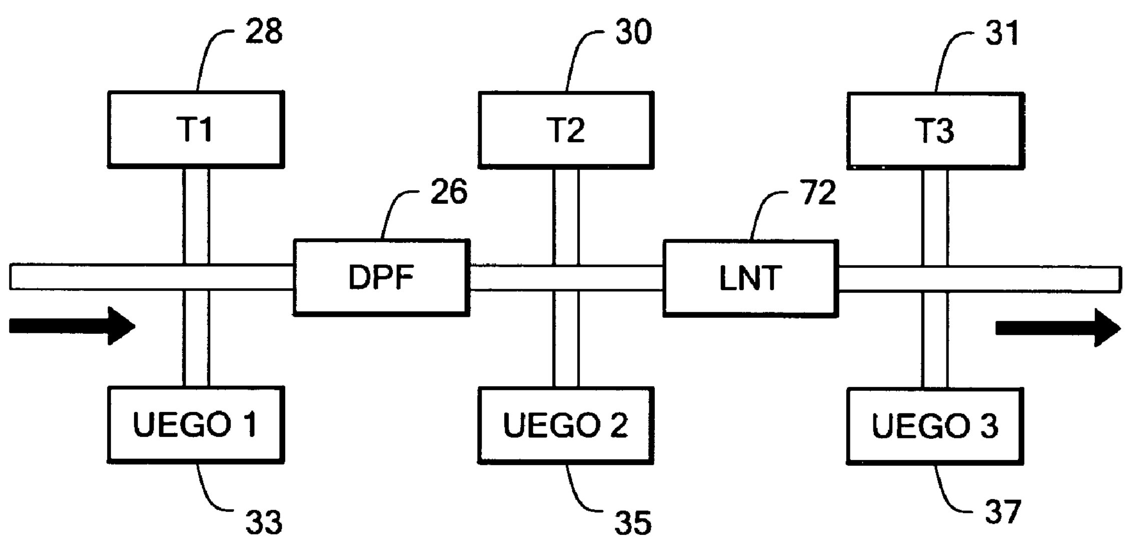
FIG. 3 is a diagram showing a portion of the engine system of FIG. 1.

Referring also to FIG. 3, a first temperature sensor 28 which produces a temperature signal T1 is located upstream of the particulate filter 26, a second temperature sensor 30 which produces a temperature signal T2 is located downstream of the particulate filter 26 and represents the temperature of gases exiting the DPF 26 and entering the LNT 72, and a third temperature sensor 31 downstream of the LNT produces a temperature T3 representative of the temperature of gases exiting the LNT 72.

Also provided are UEGO sensors 33, 35 and 37. UEGO sensor 33 produces a signal UEGO1 representative of the oxygen concentration of gases entering the DPF 26. UEGO sensor 35 produces a signal UEGO2 representative of the oxygen concentration of gases exiting the DPF 26 and entering the LNT 72. UEGO sensor 37 produces a signal UEGO3 representative of the oxygen concentration of gases exiting the LNT 37.

The particulate filter 26 is typically made of SiC, NZP and cordierite, with SiC being the most temperature resistant, and cordierite the least. Further, independent of the material used, self-sustained filter regeneration can be obtained simply by raising the particulate filter to a high enough temperature.

Each of the sensors described above provides a measurement indication to controller 34 as described below herein. Further, throttle position and EGR valve position are controlled via the controller 34 as described later herein.

Figure 2:
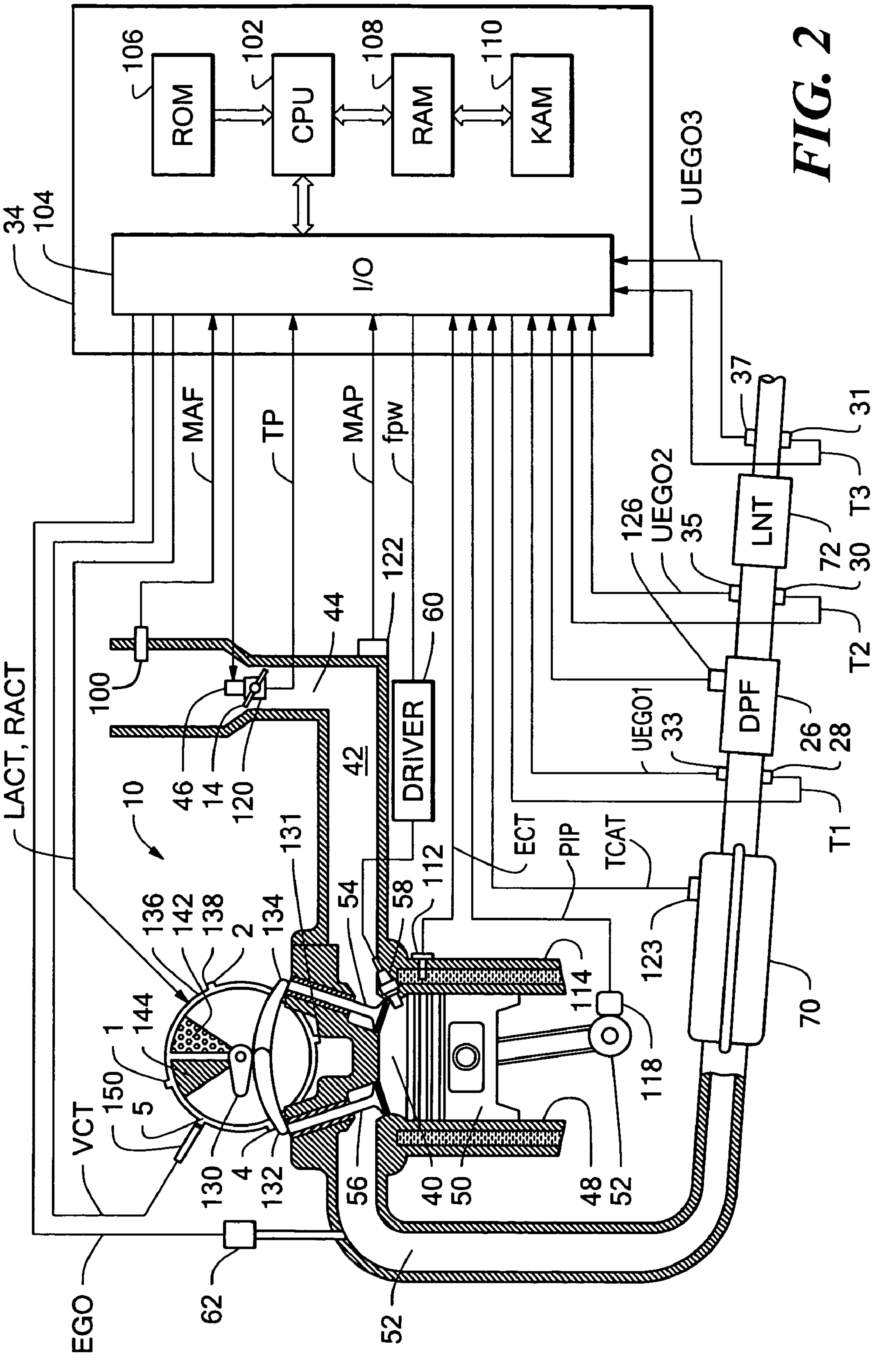
FIG. 2 is a diagram showing in more detail the control system for the engine system of FIG. 1.

FIG. 2 shows additional details of components shown and described in FIG. 1. Direct injection compression ignited internal combustion engine 10, comprising a plurality of combustion chambers, is controlled by electronic engine controller 34. Combustion chamber 40 of engine 10 is shown in FIG. 2 including combustion Intake manifold 42 is shown communicating with throttle body 44 via throttle plate 14.

In this particular example, throttle plate 14 is coupled to electric motor 46 so that the position of throttle plate 14 is controlled by controller 34 via electric motor 46. This configuration is commonly referred to as intake throttle (ITH). In diesels, the ITH is frequently vacuum actuated; however, it could also be electrically actuated. chamber walls 48 with piston 50 positioned therein and connected to crankshaft 52.

Combustion chamber or cylinder 40 is shown communicating with intake manifold 42 and exhaust manifold 52 via respective intake valves 54, and exhaust valves 56. Fuel injector 58 is shown directly coupled to combustion chamber 40 for delivering liquid fuel directly therein in proportion to the pulse width of signal fpw received from controller 34 via electronic driver 60. Fuel is delivered to fuel injector 58 by a high pressure fuel system (not shown) including a fuel tank, fuel pumps, and a fuel rail.

Exhaust gas oxygen sensor 62 is shown coupled to exhaust manifold 52 upstream of active lean NOx catalyst 70. In this particular example, sensor 62 provides signal EGO to controller 34. This oxygen sensor is a so-called UEGO, or linear oxygen sensor, and provides continuous oxygen readings.

Controller 34 causes combustion chamber 40 to operate in a lean air-fuel mode. Also, controller 34 adjusts injection timing to adjust exhaust gas temperature.

As noted above, the diesel particulate filter (DPF) 26 is shown positioned downstream of catalyst 70. DPF 70 retains particles and soot to be later regenerated (burned) at high temperatures as described herein. As noted above, downstream of the DPF 26 is the lean NOx trap (LNT) 72.

Controller 34 is shown in FIG. 2 as a conventional unit 102, input/output ports 104, an electronic storage medium for executable programs and calibration values shown as read-only memory semiconductor chip 106 in this particular example, random access memory 108 for storing a computer program which controls the engine 10. Included in such computer program is a set of instructions for executing a method described below in connection with FIG. 4. Also included are a keep-alive memory 110, and a conventional I/O data bus.

Controller 34 is shown receiving various signals from sensors coupled to engine 10, in addition to those signals previously discussed, including measurement of inducted mass air flow (MAF) from mass air flow sensor 100 coupled to throttle body 44; engine coolant temperature (ECT) from temperature sensor 112 coupled to cooling sleeve 114; a profile ignition pickup signal (PIP) from variable reluctance sensor (VRS) 118 coupled to crankshaft 40; throttle position TP from throttle position sensor 120; and absolute manifold pressure signal (MAP) from sensor 122. Engine speed signal RPM is generated by controller 34 from signal PIP in a conventional manner and manifold pressure signal MAP from a manifold pressure sensor provides an indication of boost pressure in the intake manifold.

In this particular example, the temperature Tdpf of DPF 26 is inferred from engine operation. In an alternate embodiment, and temperature Tdpf is provided by temperature sensor 126. Continuing with FIG. 2, a variable camshaft system is described. However, the present invention can also be used with non-VCT engines. Camshaft 130 of engine 10 is shown communicating with rocker arms 132 and 134 for actuating intake valve 54 and exhaust valve 56. Camshaft 130 is directly coupled to housing 136. Housing 136 forms a toothed wheel having a plurality of teeth 138. Housing 136 is hydraulically coupled to an inner shaft (not shown), which is, in turn, directly linked to camshaft 130 via a timing chain (not shown). Therefore, housing 136 and camshaft 130 rotate at a speed substantially equivalent to the inner camshaft. The inner camshaft rotates at a constant speed ratio to crankshaft 40. However, by manipulation of the hydraulic coupling as will be described later herein, the relative position of camshaft 130 to crankshaft 52 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 54 and exhaust valves 56 open and close at a time earlier than normal relative to crankshaft 52. Similarly, by allowing high pressure hydraulic fluid to enter retard chamber 144, the relative relationship between camshaft 130 and crankshaft 40 is retarded. Thus, intake valves 54 and exhaust valves 56 open and close at a time later than normal relative to crankshaft 52.

In addition, controller 34 sends control signals (LACT, RACT) to conventional solenoid valves (not shown) to control the flow of hydraulic fluid either into advance chamber 142, retard chamber 144, or neither. Relative cam timing is measured using the method described in U.S. Pat. No. 5,548,995, which is incorporated herein by reference.

In general terms, the time or rotation angle between the rising edge of the PIP signal and receiving a signal from one of the plurality of teeth 138 on housing 136 gives a measure of the relative cam timing. Sensor 160 provides an indication of oxygen concentration in the exhaust gas. Signal 162 provides controller 34 a voltage indicative of the $O_2$ concentration.

Note that FIG. 2 merely shows one cylinder of a multi-cylinder engine, and that each cylinder has its own set of intake/exhaust valves, fuel injectors, etc.

In FIG. 1, an EGR system is included. In particular, EGR Valve 16 (FIG. 1) (which can be electrically, pneumatically or magnetically controlled) is positioned in a recirculation tube that transmits exhaust gas from manifold 52 to intake manifold 42.

A method and system are provided for controlling the rate of DPF regeneration by metering the oxygen in the inlet gas to the DPF is described in the above referenced patent application, the entire subject mater thereof heaving been incorporated herein by reference. The current invention builds on that invention. More particularly, when the DPF 26 is regenerated, the DPF exit temperature is high enough for LNT desulfation. To achieve desulfation of the LNT there is also a need to achieve sufficient oxygen depletion of the gas entering the LNT. The inventors have discovered the use of an oxygen sensor (UEGO sensor 33) upstream of the DPF 26 to control the DPF 26 regeneration rate by metering the oxygen flow of the gases entering the DPF 26 using UEGO 33. The inventors have also discovered the use of an oxygen sensor 35 downstream of the DPF 26 to control the oxygen content of the gas entering the LNT 72. The goal is to remove the oxygen from the gas that exits the DPF 26.

In general, the oxygen content of the gas exiting the DPF 26 will be lower than that entering the DPF 26, since soot combustion removes oxygen. By adjusting the oxygen level into the DPF 26 to increase the CO level out of the DPF 26. The CO acts as a reductant for desulfation by the LNT 72. Lower oxygen concentration into the DPF results in a higher CO concentration out of the DPF 26 and vice versa.

If the oxygen measured by UEGO sensor 35 (i.e., UEGO2) is too high, the oxygen content of the gas entering the DPF 26 is reduced (by the means set forth in the above-referenced patent application). This will increase the flow of reductant and decrease the oxygen flow into the LNT 72.

If the gas entering the LNT 72 is too rich for too long a time, sulfur is released preferentially as H2S, which is undesirable. If the UEGO sensor 35 (i.e., UEGO2) measures exhaust gas that is too rich, the oxygen concentration into the DPF 26 is increased by the means set forth in the above-referenced patent application. This may lead to excessive exotherms, since higher oxygen concentrations allow a higher soot burn rate. The control strategy herein described monitors the temperature T2 (using sensor 30) of the gas exiting the DPF and reduce the DPF 26 inlet oxygen concentration if this temperature becomes too high. The optimal oxygen flow into the DPF 26 is therefore a trade-off between DPF temperature, soot burn rate, and H2S release by the LNT 72.

Thus, the invention utilizes the heat generated already for DPF 26 regeneration and the removal of oxygen from the exhaust stream by soot combustion to create rich exhaust gas, and to achieve LNT desulfation. The LNT desulfation then does not take a large penalty on fuel economy above that for DPF regeneration.

Figure 4:
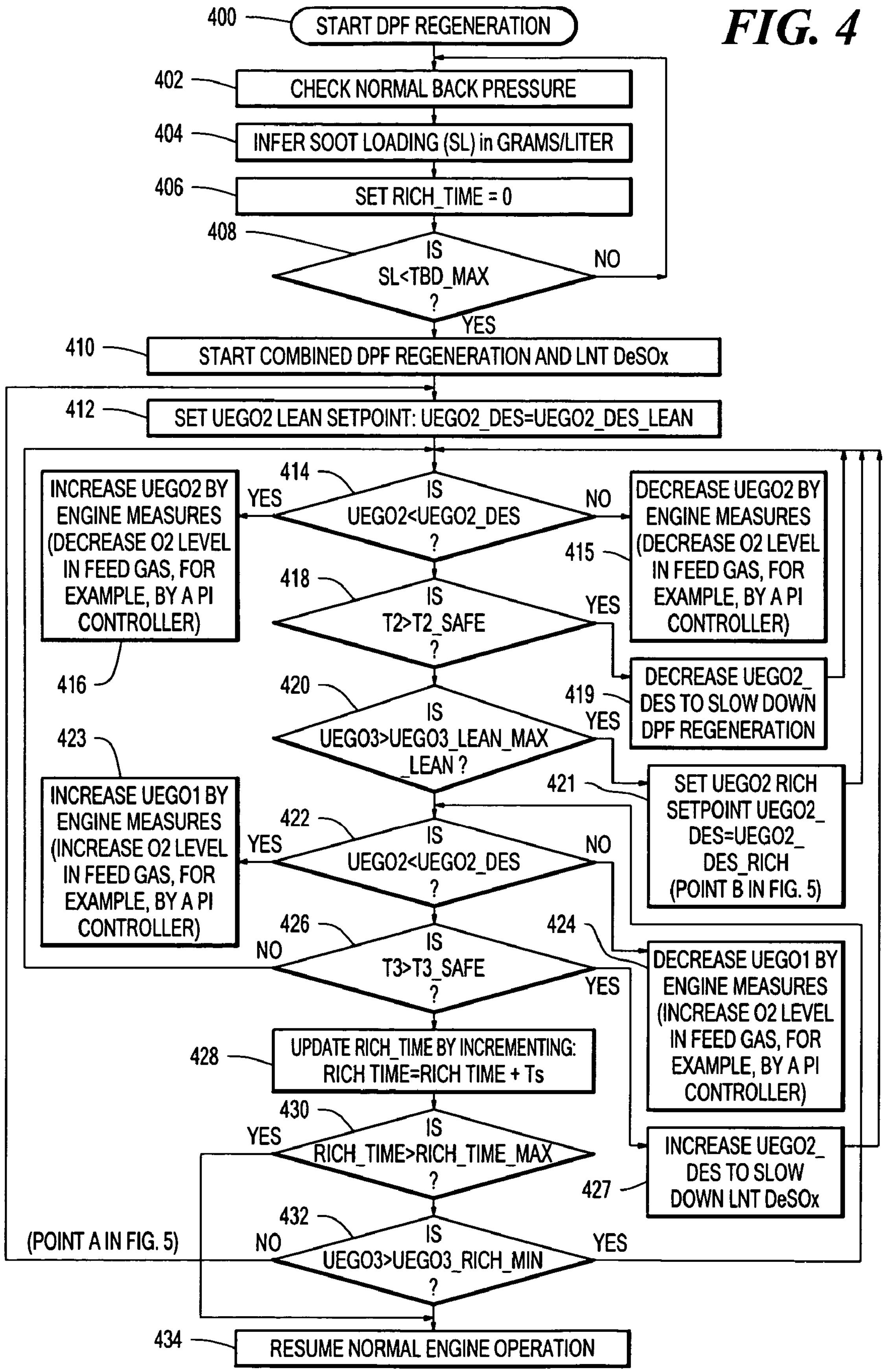
FIG. 4 is a flow diagram of a program stored in the engine system of FIG. 1.

Referring now to the flow diagram in FIG. 4, DPF regeneration begins in Step 400. In Step 402, a check is made of normalized backpressure (using the differential pressure sensor 32). In Step 404, soot-loading SL in grams/liter is inferred from a previously calibrated table. Next, in Step 406, RICH_TIME is set equal to 0.

In Step 408, a determination is made as to whether SL<TBD_MAX, where TBD_MAX is determined experimentally. If SL is not less than TBD_MAX, the process returns to Step 402; otherwise, the process proceed to Step 410. In Step 410, the combined DPF regeneration and LNT deSOx commences.

Thus, the process, in Step 412, sets UEGO2 lean setpoint; i.e., a predetermined level of oxygen concentration, UEGO2, is established. More particularly, UEGO2_DES=UEGO2_DES_LEAN, where UEGO2_DES_LEAN is established for a particular engine type a priori.

In Step 413, a determination is made as to whether the oxygen concentrations, i.e., air fuel ratio, sensed by UEGO sensor 35 (i.e., UEGO2) is less than UEGO2_DES. If it is, the oxygen concentration as sensed by UEGO sensor 33 (i.e., UEGO1) is increased reduced by the means set forth in the above-referenced patent application. For example, the increase in oxygen concentration is produced by engine measures (e.g. increase O2 level in feed gas, for example by means of a PI controller, as described in the above referenced patent application, Step 415. On the other hand, if UEGO2>UEGO_DES, the oxygen concentration as sensed by UEGO sensor 33 (i.e., UEGO)1 is decreased by such engine measures, Step 416. Thus, Steps 413, 415 and 416 adjust the oxygen concentration as sensed by UEGO sensor 33 (i.e., UEGO1) of the gases into the DPF 26 in accordance with the oxygen concentration of the gases exiting the DPF, such exiting oxygen concentration being sensed by UEGO sensor 35 (i.e., UEGO2) relative to setpoint UEGO2_DES_LEAN.

During this control process, the temperature, T2, at the output of the DPF 26 is measured by sensor 30 and compared with a predetermined temperature level T2_SAFE established for a particular engine type a priori, Step 118. If T2 exceeds T2_SAFE, the set point UEGO2_DES is reduced in order to slow down the regeneration, Step 419.

During this control process, the oxygen concentration of the gases exiting the LNT is measured by UEGO sensor 37 (i.e., UEG03) and such concentration is compared with an a priori established predetermined level UEGO3_LEAN_MAX_LEAN in Step 420. If the oxygen concentration of the gases exiting the LNT is less than UEGO3_LEAN_MAX_LEAN, the process returns to Step 404; otherwise, the UEGO2 set point, UEGO2_DES is set is changed to an a priori established predetermined set point UEGO2_DES_RICH, Step 421.

While the process proceeds as described above, a determination as made as to whether the oxygen concentration as sensed by LEGO sensor 35 (i.e., UEGO2) is less than UEGO2_DES, Step 422. If UEGO2<UEGO2_DES, the oxygen concentration as sensed by UEGO sensor 33 (i.e., UEGO1) is increase. The increase in oxygen concentration is produced by engine measures (e.g. increase O2 level in feed gas, for example by means of a PI controller, as described in the above referenced patent application), Step 423. On the other hand, if UEGO2>UEGO2_DES, the oxygen concentration as sensed by UEGO sensor 33 (i.e., UEGO1) is decreased by such engine measures, Step 424. Thus, Steps 422, 423 and 424 adjust the oxygen concentration as sensed by LEGO sensor 33 (i.e., LEGO1) of the gases into the DPF in accordance with the oxygen concentration of the gases exiting the DPF, such exiting oxygen concentration being sensed by UEGO sensor 35 (i.e., UEGO2) relative to setpoint UEGO2_DES which may be either UEGO2_DES_LEAN, UEGO2_DES_LEAN reduced if T2 exceeds T2_SAFE, or UEGO2_DES_RICH if the oxygen concentration of the gases exiting the LNT is less than UEGO3_LEAN_MAX_LEAN.

A determination is made in Step 426 as to whether the temperature T3 of the gases exiting the LNT (sensed by sensor 31) is greater than an a priori predetermined established level T3_SAFE, Step 126. If T3>T3_SAFE, the set point UEGO2_DES is increased to slow down LNT deSOx, Step 427.

Next, in Step 428, the RICH_TIME is incremented; RICH_TIME=RICH_TIME+Ts, where Ts is the processing interval. If, in Step 128, RICH_TIME>RICH_TIME_MAX, the process terminates regeneration and deSOx, Step 434; otherwise, the process continues and, in Step 432, a determination is made as to whether the oxygen concentration of the gases exiting the LNT 72 as sensed by UEGO sensor 37 (i.e., UEGO3) is greater than an a priori set point UEGO3_RICH_MIN, Step 432. If it is, the process returns to Step 422 and the deSOx process continues; otherwise the process returns to Step 412 to continue with the combination DFP regeneration and LNT deSOx.

Thus, from the flow diagram it is noted that, neglecting the effects of T2_SAFE and T3_SAFE, one of two different set points are used for UEGO2_DES; i.e., UEGO2_DES=UEGO2_DES_LEAN (Step 412, FIG. 4) or UEGO2_DES UEGO2_DES_RICH (Step 412, FIG. 4).

Figure 5:
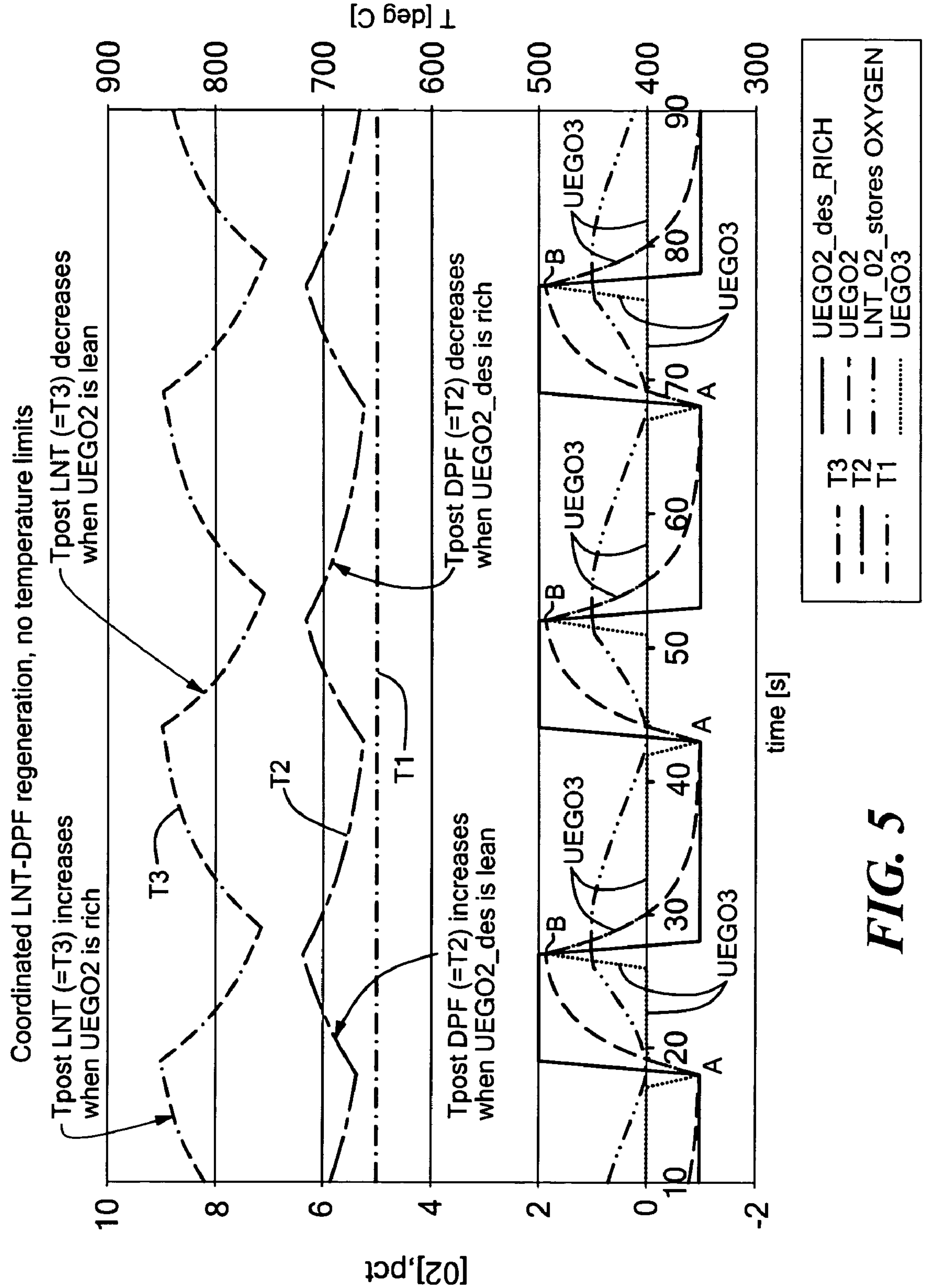
FIG. 5 shows time histories of parameters generated by the engine system of FIG. 1 in the absences of temperature limit controls.

Thus, referring to FIG. 5, when UEGO3 is less than UEGO3_RICH_MIN (i.e., at times indicated by in FIG. 5 by A) the set point UEGO2_DES changes from UEGO2_DES_RICH to UEGO2_DES_LEAN and when UEGO3 is greater than UEGO3_RICH_MIN (i.e., at times indicated by in FIG. 5 by B) the set point UEGO2_DES changes from UEGO2_DES_LEAN to UEGO2_DES_RICH.

It is also noted from FIG. 5 that T3 increases when UEGO3 is rich and T3 decreases when UEGO2 is lean. Further, it is noted that T2 increases when UEGO2_DES has the set point UEGO2_DES_LEAN and T2 decreases when UEGO2_DES has the set point UEGO2_DES_RICH. Finally, it is noted that LNT stores oxygen during the intervals between times indicated by A.

Figure 6:
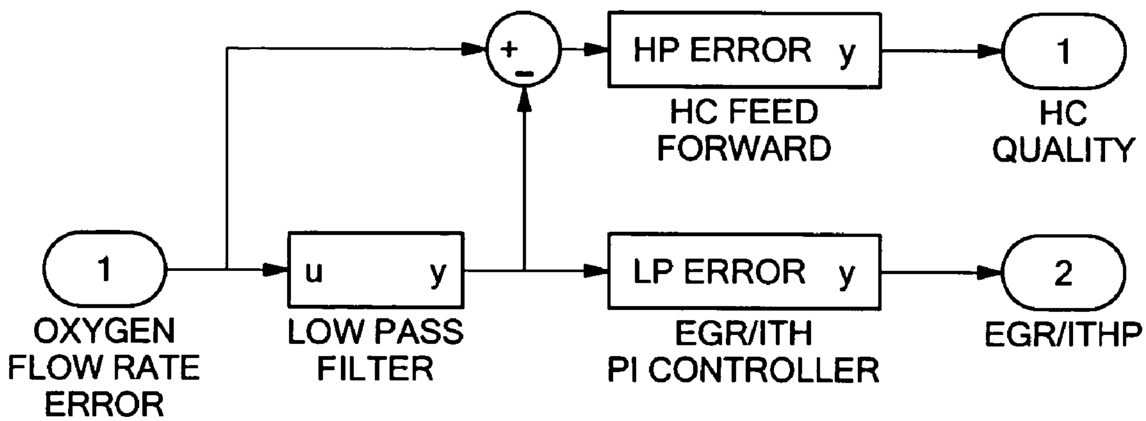
FIG. 6 shows a controller block diagram of an oxygen controller used in the system of FIG. 1.

Referring now to FIG. 6, a high level schematic of the oxygen controller is shown. In particular in this embodiment, three actuators are used to limit the supply of oxygen delivered to the DPF 26: an exhaust gas recirculation valve (EGR), an intake throttle (ITH) and a (hydrocarbon) (HC) injector located in the exhaust feedback. EGR and ITH are used in feedback control to account for slowly varying changes in the oxygen flow rate supply to the DPF.

As described above, the UEGO sensors 35 (i.e., UEGO2) and 37 (UEGO3) are used as the feedback sensors. In the present embodiment, quick changes in oxygen flow rate are compensated using the HC injector in a feed-forward control. While injecting hydrocarbons can supply additional heat to the DPF, there are instances where this additional heat will be more than compensated for by reducing the exothermic reaction rate (by limiting excess oxygen). Part of the heat added to the system upstream is rejected by heat transfer to the environment through the exhaust system. Adding heat upstream also gives a much more uniform heat distribution that is less likely to damage the DPF than local hot spots resulting from local burning on the DPF 26. In particular, the hydrocarbon feed-forward controller, in one embodiment, simply calculates the quantity of fuel necessary to stoichiometrically combust with the high pass oxygen flow rate error. However, the control authority of the HC injection is one-sided since HC injection can only remove excess oxygen.

Note, in an alternative embodiment, other control structures can be used. For example, rather than using the EGR valve, the intake throttle, or a hydrocarbon injector, the oxygen concentration in the exhaust can be modified by changing intake or exhaust valve timing on an engine equipped with an appropriate actuator. If the engine is equipped with a variable geometry turbocharger (VGT), the vane setting on the VGT can be modified. If the engine is equipped with an exhaust brake, its position can be modified.

Referring now specifically to FIG. 6, the oxygen flow rate error (which is the error between the desired and actual oxygen flow rate. More particularly, UEGO 2 and UEGO3 measure air fuel ratio or oxygen concentration. They are equivalent. To be precise: the measurement is $O_2$ concentration=0.2*(AFR−14.6)/(AFR+1) and is fed to a low-pass filter. The cutoff frequency of the low-pass filter is preferably selected as the bandwidth of the EGR/ITH controller, defined from the oxygen flow rate error to the oxygen flow rate. In one example, the cutoff frequency was selected as 0.5 RAD/S. However, various factors such as controller stability and feedback control performance effect the selection of this frequency. Therefore, various values may be used according to the present invention. In another example, the cutoff frequency is made a calibratable function of engine operating conditions. Also, it may be desirable to increase this cutoff frequency as high as possible, thereby improving controller performance and minimizing control action necessary from the HC injector. The highest possible cutoff frequency is equal to the bandwidth of the EGR/ITH controller. Then, the oxygen flow rate error minus the low-pass filtered error is fed to the feed-forward controller to determine the HC injection quantity. Further, the low-pass filtered oxygen flow rate error is fed to the EGR/ITH PI controller, which determines the control action for the EGR valve and the throttle valve.

Also, the present invention is described with particular reference to a self-sustaining DPF regeneration. Such self-sustaining regeneration is used to refer to the regeneration of stored particles in the DPF that continues without additional control action beyond normal other engine operation. For example, the engine control system may need to adjust fuel injection timing, or other operating parameters, to initiate increased exhaust temperatures. Thus, these conditions would include non-normal operation required to start particulate filter regeneration. However, once the self-sustaining regeneration is reached, the engine operating parameters can be returned to whatever normal conditions require. As such, the particulate filter regeneration will continue as long as enough excess oxygen is present and there are stored particles left to be burned.

As another example, an external burner could be used to raise particulate filter temperature above the self-sustained regeneration temperature. After this point, the burner is no longer necessary and the self-sustaining reaction can proceed without any special control action by the engine controller. According to the present invention, this self-sustaining regeneration is monitored via, for example, the particulate filter temperature, and, in one example, when the temperature is greater than a predetermined temperature control, action is taken to limit excess oxygen and thereby limit the diesel particulate filter regeneration reaction rate. This limits the self-sustaining reaction, thereby limiting temperature and minimizing any potential degradation.

A number of embodiments of the invention have been described. For example, as described above, there are various parameters that can be used to limit oxygen entering a DPF during a self-sustained filter regeneration interval. Also note that it is not necessary and not intended to completely stop filter regeneration to prevent DPF temperature from becoming greater than an allowable temperature. In particular, during some operating conditions, excess oxygen fed to the DPF can be reduced thereby slowing the exothermic reactions in the DPF, but still providing enough gas flow rate through the DPF to carry away enough excess heat from this continued regeneration so that DPF temperature is maintained at or below an allowable temperature. Further, the upstream UEGO sensor can be replaced by an estimator of feed gas oxygen, based on engine operating conditions. The deSOx typically takes less time than DPF regeneration, hence one only needs to run the LNT oxygen control for part of the DPF regeneration. Preferably this is towards the end of the DPF regeneration, when there is still enough soot to generate reductant (CO) in the DPF, but not so much soot that to risk an uncontrolled DPF regeneration resulting in excessive exotherms. The oxygen content into the DPF can be decreased by throttling the engine, increasing EGR level, retarding timing accompanied by increasing fuel quantity, changing valve timing, post injecting fuel into the cylinder, injecting fuel via a downstream injector, etc. Nevertheless, it will be understood that various modifications may be made without departing from the spirit and scope of the invention Accordingly, other embodiments are within the scope of the following claims.

What is claimed is:

1. A method for regenerating a particulate filter coupled to an internal combustion engine and for desulfating a lean NOx trap disposed downstream of the particulate filter, comprising:

providing a first oxygen sensor upstream of the particulate filter;

providing a second oxygen sensor at a position downstream of the particulate filter and upstream of the trap; and controlling the particulate filter regeneration rate and NOx tram desufation in response to both the metered oxygen flow of gases entering the particulate filter using the first oxygen sensor and oxygen content of gases entering the lean NOx trap using the second oxygen sensor.

2. The method recited in claim 1 including adjusting at least one engine operating parameter to control both regeneration in the particulate filter and the desulfation of the lean NOx trap.

3. A method for regenerating a particulate filter coupled to an internal combustion engine and for desulfating a lean NOx trap disposed downstream of the particulate filter, comprising:

providing a first oxygen sensor upstream of the particulate filter;

providing a second oxygen sensor at a position downstream of the particulate filter and upstream of the trap; and adjusting, in response to the first and second oxygen sensors, at least one engine operating parameter to maintain a desired air fuel ratio for gases exiting the particulate filter in accordance with a difference between a reference set point air fuel ratio level and the air fuel ratio of gases exiting the particulate filter and wherein the reference set point level is changed between a rich air fuel ratio and a lean air fuel ratio as a function of the air fuel ratio of the gases exiting the lean NOx trap.

4. A method for simultaneously regenerating a particulate filter coupled to an internal combustion engine and for desulfating a lean NOx trap disposed downstream of the particulate filter, comprising:

adjusting at least one engine operating parameter to maintain a desired air fuel ratio for gases exiting the particulate filter in accordance with a difference between a reference set point air fuel ratio level and the air fuel ratio of gases exiting the particulate filter and wherein the reference set point level is changed between a rich air fuel ratio and a lean air fuel ratio as a function of the air fuel ratio of the gas exiting the lean NOx trap wherein the regeneration control comprises:

commencing a self-sustaining filter regeneration;

monitoring whether said regeneration causes temperature of said particulate filter to become greater than a predetermined value;

in response to said monitoring, adjusting one or more operating parameters so as to limit exothermic reaction via control of an excess oxygen amount entering said filter and prevent temperature from rising to become greater than a pre-selected value.

5. A method for regenerating a particulate filter coupled to an internal combustion engine and for desulfating a lean NOx trap disposed downstream of the particulate filter, comprising:

providing a first oxygen sensor upstream of the particulate filter;

providing a second oxygen sensor at a position downstream of the particulate filter and upstream of the trap;

controlling, in response to the first and second oxygen sensors, the oxygen concentration of the gas exiting the lean NOx trap by commanding an oxygen concentration setpoint for the gas entering the lean NOx trap, such commanded oxygen concentration being controlled by commanding an oxygen concentration setpoint for the gas entering the particulate filter.

6. A method for regenerating a particulate filter coupled to an internal combustion engine and for desulfating a lean NOx trap disposed downstream of the particulate filter, comprising:

providing a first oxygen sensor upstream of the particulate filter and using a signal produced by such sensor to control the particulate filter regeneration rate by metering the oxygen flow sensed by sensor and;

providing a second oxygen sensor at a position downstream of the particulate filter and upstream of the lean NOx trap and using a signal produced by such second sensor to control the oxygen content of the gas entering the lean NOx trap.

7. A method for simultaneously regenerating a particulate filter coupled to an internal combustion engine and for desulfating a lean NOx trap disposed downstream of the particulate filter, comprising:

providing a first oxygen sensor upstream of the particulate filter;

providing a second oxygen sensor at a position downstream of the particulate filter and upstream of the trap; and adjusting, in response to the first and second sensors, the oxygen level into the particulate filter, comprising:

reducing the oxygen content of the gas entering the particulate filter if the oxygen concentration measured by downstream oxygen sensor is greater than a predetermined level, such latter oxygen content being measured by the upstream oxygen sensor;

increasing the oxygen content of the gas entering the particulate filter if the oxygen concentration measured by downstream oxygen sensor is less than the predetermined level, such latter oxygen content being measured by the upstream oxygen sensor.

8. The method recited in claim 7 including:

monitoring the temperature of the gas exiting the particulate filter and reducing the oxygen concentration into the particulate filter if such measured temperature becomes greater than a predetermined level.

9. The method from claim 7 including:

monitoring the temperature of the gas exiting the lean NOx trap and increasing the oxygen concentration into the particulate filter if such measured temperature becomes greater than a predetermined level.

10. A system, comprising:

a particulate filter coupled to an internal combustion engine;

a lean NOx trap disposed downstream of the particulate filter; and a first oxygen sensor disposed upstream of the filter;

a second oxygen sensor positioned downstream of the particulate filter and downstream of the lean NOx trap; and a processor for simultaneously controlling the particulate filter regeneration rate and NOx trap desufation in response to the both the metered oxygen flow of gases entering the particulate filter using the first oxygen sensor and oxygen content of gases entering the lean NOx trap using the second oxygen sensor.

11. The system recited in claim 10 wherein the processor including adjusts at least one engine operating parameter to control both regeneration in the particulate filter and the desulfation of the lean NOx trap.

12. A system, comprising:

a particulate filter coupled to an internal combustion engine;

a lean NOx trap disposed downstream of the particulate filter; and a first oxygen sensor disposed upstream of the filter;

a second oxygen sensor positioned downstream of the particulate filter and downstream of the lean NOx trap; and a processor, responsive to the first and second oxygen sensors, for simultaneously producing regeneration in the particulate filter and producing desulfating in the lean NOx trap by adjusting at least one engine operating parameter to maintain a desired air fuel ratio for gases exiting the particulate filter in accordance with a difference between a reference set point air fuel ratio level and the air fuel ratio of gases exiting the particulate filter to simultaneously produce regeneration in the particulate filter and to produce for desulfating in the lean NOx trap, and wherein the reference set point level is changed between a rich air fuel ratio and a lean air fuel ratio as a function of the air fuel ratio of the exiting gas lean NOx trap.

13. A system, comprising:

a particulate filter coupled to an internal combustion engine;

a lean NOx trap disposed downstream of the particulate filter; and a processor for simultaneously producing regeneration in the particulate filter and producing desulfating in the lean NOx trap by adjusting at least one engine operating parameter to maintain a desired air fuel ratio for gases exiting the particulate filter in accordance with a difference between a reference set point air fuel ratio level and the air fuel ratio of gases exiting the particulate filter to simultaneously produce regeneration in the particulate filter and to produce for desulfating in the lean NOx trap, and wherein the reference set point level is changed between a rich air fuel ratio and a lean air fuel ratio as a function of the air fuel ratio of the gas exiting the lean NOx trap;

wherein the regeneration control comprises:

commencing a self-sustaining filter regeneration;

monitoring whether said regeneration causes temperature of said particulate filter to become greater than a predetermined value;

in response to said monitoring, adjusting one or more operating parameters so as to limit exothermic reaction via control of an excess oxygen amount entering said filter and prevent temperature from rising to become greater than a pre-selected value.

14. A system, comprising:

a particulate filter coupled to an internal combustion engine;

a lean NOx trap disposed downstream of the particulate filter; and a first oxygen sensor disposed upstream of the filter;

a second oxygen sensor positioned downstream of the particulate filter and downstream of the lean NOx trap; and a processor, responsive to the first and second oxygen sensors, for producing signals to simultaneously regenerate the particulate filter and to desulfate the lean NOx trap by controlling the oxygen concentration of the gas exiting the particulate filter by commanding an oxygen concentration setpoint for the gas entering the particulate filter, such commanded oxygen concentration being controlled by commanding an oxygen concentration setpoint for the gas entering the particulate filter.

15. A system, comprising:

a particulate filter coupled to an internal combustion engine;

a lean NOx trap disposed downstream of the particulate filter; and a processor for simultaneously regenerating the particulate filter and for desulfating the lean NOx trap, comprising:

providing a first oxygen sensor upstream of the particulate filter and using a signal produced by such sensor to control the particulate filter regeneration rate by metering the oxygen flow sensed by sensor and;

providing a second oxygen sensor positioned downstream of the particulate filter and upstream of the lean NOx trap and using a signal produced by such second sensor to control the oxygen content of the gas entering the lean NOx trap.

16. A system, comprising:

a particulate filter coupled to an internal combustion engine;

a lean NOx trap disposed downstream of the particulate filter; and a first oxygen sensor disposed upstream of the filter;

a second oxygen sensor positioned downstream of the particulate filter and downstream of the lean NOx trap; and a processor, responsive to the first and second sensors, for simultaneously regenerating the particulate and for desulfating the lean NOx trap, comprising:

adjusting the oxygen level into the particulate filter, comprising:

reducing the oxygen content of the gas entering the particulate filter if the oxygen concentration measured by downstream oxygen sensor is greater than a predetermined level, such latter oxygen content being measured by the upstream oxygen sensor;

increasing the oxygen content of the gas entering the particulate filter if the oxygen concentration measured by downstream oxygen sensor is less than the predetermined level, such latter oxygen content being measured by the upstream oxygen sensor.

17. The system recited in claim 16 wherein the processor:

monitors the temperature of the gas exiting the particulate filter and reducing the oxygen concentration into the particulate filter if such measured temperature becomes greater than a predetermined level.

18. The system recited in claim 17 wherein the processor monitors the temperature of the gas exiting the lean NOx trap and increasing the oxygen concentration into the particulate filter if such measured temperature becomes greater than a predetermined level.

19. An article of manufacture comprising:

a computer storage medium having a program encoded for simultaneously regenerating a particulate filter coupled to an internal combustion engine and for desulfating a lean NOx trap disposed downstream of the particulate filter, such computer storage medium comprising:

code for adjusting at least one engine operating parameter in response to a first oxygen sensor upstream of the particulate filter and a second oxygen sensor positioned downstream of the particulate filter and upstream of the trap-to maintain a desired air fuel ratio for gases exiting the particulate filter in accordance with a difference between a reference set point air fuel ratio level and the air fuel ratio of gases exiting the particulate filter and wherein the reference set point level is changed between a rich air fuel ratio and a lean air fuel ratio as a function of the air fuel ratio of the gas exiting the lean NOx trap.

20. The article of manufacture recited in claim 19 wherein the computer storage medium is a semiconductor chip.

* * * * *